(12) United States Patent
Levin et al.

(10) Patent No.: US 11,459,254 B2
(45) Date of Patent: Oct. 4, 2022

(54) MAINTAINING A STEADY MICROBIAL COMMUNITY IN A COMBINED ANAEROBIC-AEROBIC APPARATUS

(71) Applicant: S.G.T.—SUSTAINABLE GREEN TECHNOLOGIES LTD, Netanya (IL)

(72) Inventors: Gal Levin, Netanya (IL); Reuven Eitan, Giv'at Shmuel (IL)

(73) Assignee: S.G.T.—SUSTAINABLE GREEN TECHNOLOGIES LTD, Netanya (IL)

( * ) Notice: Subject to any disclaimer, the term of this patent is extended or adjusted under 35 U.S.C. 154(b) by 0 days.

(21) Appl. No.: 17/274,623

(22) PCT Filed: Sep. 16, 2019

(86) PCT No.: PCT/IL2019/051032
§ 371 (c)(1),
(2) Date: Mar. 9, 2021

(87) PCT Pub. No.: WO2020/058973
PCT Pub. Date: Mar. 26, 2020

(65) Prior Publication Data
US 2022/0048798 A1    Feb. 17, 2022

(30) Foreign Application Priority Data

Sep. 17, 2018    (IL) .......................................... 261848

(51) Int. Cl.
*C02F 3/28*    (2006.01)
*C02F 3/12*    (2006.01)
(Continued)

(52) U.S. Cl.
CPC ............ *C02F 3/286* (2013.01); *C02F 3/1263* (2013.01); *C02F 3/282* (2013.01); *C02F 3/30* (2013.01);
(Continued)

(58) Field of Classification Search
CPC ........ C02F 3/286; C02F 3/1263; C02F 3/282; C02F 3/30; C02F 3/341; C02F 2101/10;
(Continued)

(56) References Cited

U.S. PATENT DOCUMENTS 6,126,827 A    10/2000    Johnson, Jr. et al.
6,444,124 B1 *    9/2002    Onyeche ................. C02F 11/04
                                                            210/603
(Continued)

FOREIGN PATENT DOCUMENTS

CN    1622921 A    6/2005
CN    107381812 A    11/2017
(Continued)

OTHER PUBLICATIONS

PCT International Search Report and Written Opinion for International Application No. PCT/IL2019/051032, dated Dec. 16, 2019, 10 pages.

(Continued)

*Primary Examiner* — Fred Prince
(74) *Attorney, Agent, or Firm* — Hoffman Warnick LLC

(57) ABSTRACT

A method and an apparatus for maintaining a stable microbial community in a combined anaerobic-aerobic waste processing system. The system comprises cycling of waste activated sludge between reactors, thereby ensuring a healthy microbial community and an efficient waste decomposition.

11 Claims, 1 Drawing Sheet

(51) Int. Cl.
  *C02F 3/30* (2006.01)
  *C02F 3/34* (2006.01)
  *C02F 101/10* (2006.01)
  *C02F 103/20* (2006.01)
  *C02F 103/22* (2006.01)
  *C02F 103/32* (2006.01)

(52) U.S. Cl.
  CPC .......... *C02F 3/341* (2013.01); *C02F 2101/10* (2013.01); *C02F 2103/20* (2013.01); *C02F 2103/22* (2013.01); *C02F 2103/32* (2013.01); *C02F 2301/046* (2013.01)

(58) Field of Classification Search
  CPC .............. C02F 2103/20; C02F 2103/22; C02F 2103/32; C02F 2301/046
  USPC .................... 210/605, 623, 630, 259, 906
  See application file for complete search history.

(56) References Cited

U.S. PATENT DOCUMENTS

| | | | | |
|---|---|---|---|---|
| 7,163,629 | B2* | 1/2007 | Abu-Orf | C02F 3/28 210/603 |
| 2002/0079266 | A1* | 6/2002 | Ainsworth | C12M 47/18 210/603 |
| 2002/0185448 | A1 | 12/2002 | Chisholm | |
| 2005/0035059 | A1* | 2/2005 | Zhang | C02F 1/441 210/605 |
| 2005/0087480 | A1 | 4/2005 | Park et al. | |
| 2005/0189295 | A1 | 9/2005 | Barnard | |
| 2012/0006745 | A1 | 1/2012 | Kaley et al. | |
| 2018/0186672 | A1 | 7/2018 | Levin | |

FOREIGN PATENT DOCUMENTS

| | | |
|---|---|---|
| KR | 101338772 B1 | 12/2013 |
| WO | 2006019256 A1 | 2/2006 |
| WO | 2012019310 A1 | 2/2012 |
| WO | 2017203505 A1 | 11/2017 |
| WO | 2017218239 A1 | 12/2017 |

OTHER PUBLICATIONS

Hala El-Kamah et al., "Treatment of high strength wastewater from fruit juice industry using integrated anaerobic/aerobic system," Elsevier, ScienceDirect, Desalination, 253, 2010, pp. 158-163.

Zhang R. et al., "Treatment of Swine Wastewater with biological conversion, filtration, and reverse osmosis: A laboratory study, Transactions of the ASAE", 2004, vol. 47, No. 1, pp. 243-250.

Extended European Search Report for Application No. 19861738.3, dated May 18, 2022, 11 pages.

Office Action for Chinese Patent Application No. 201980068919.5, dated Jul. 22, 2022.

* cited by examiner

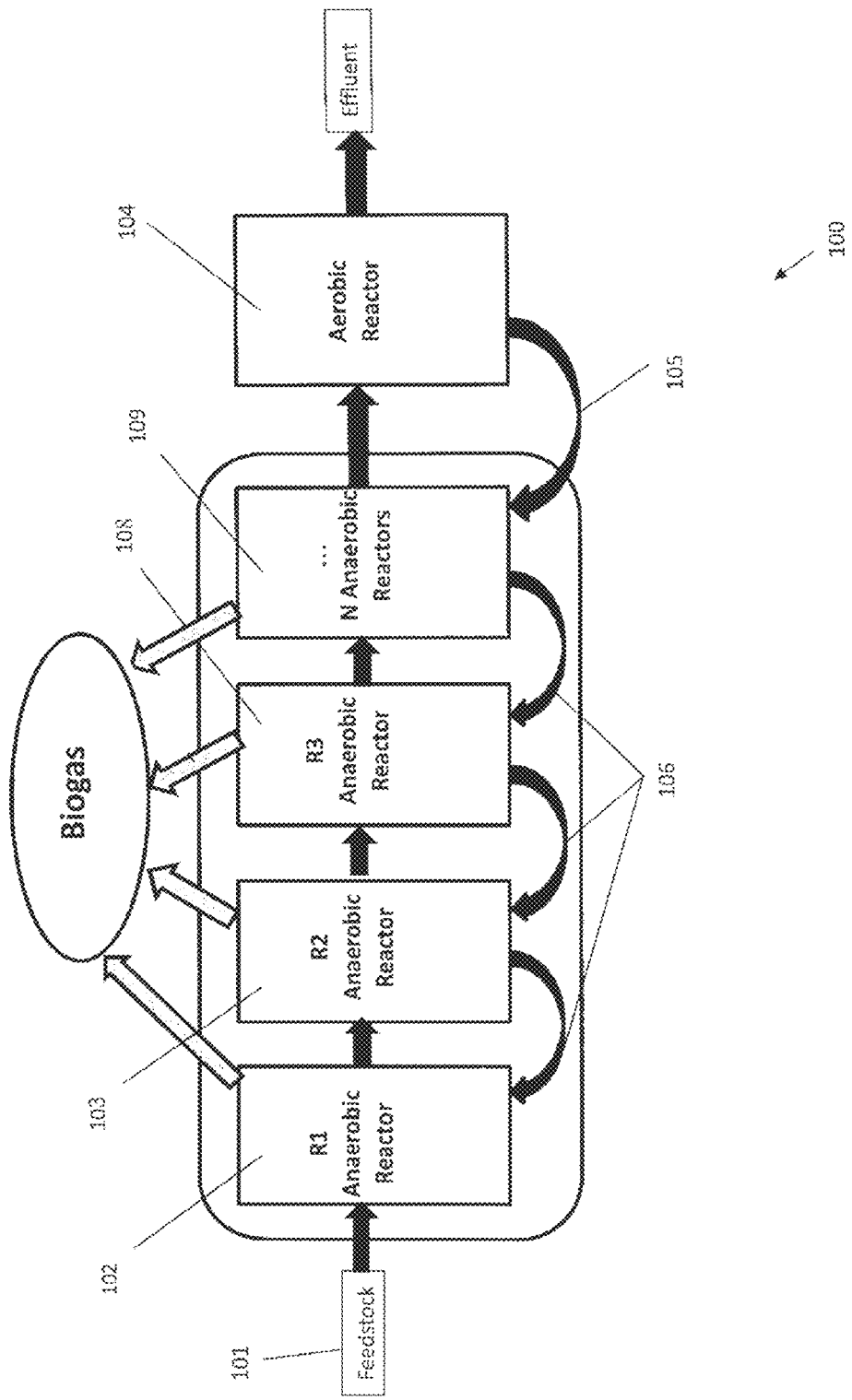

MAINTAINING A STEADY MICROBIAL COMMUNITY IN A COMBINED ANAEROBIC-AEROBIC APPARATUS

FIELD OF THE INVENTION

The present invention relates to a method for maintaining a stable microbial community in a combined anaerobic-aerobic apparatus and to an apparatus therefor. Particularly, the invention relates to recycling waste activated sludge (WAS) between reactors of the apparatus, thereby ensuring efficient digestion of feedstock.

BACKGROUND OF THE INVENTION

Anaerobic digestion (AD) is a biological process that breaks down organic materials (feedstocks) in the absence of oxygen (anaerobic conditions) into biogas, containing mainly methane ($CH_4$) and carbon dioxide ($CO_2$). Combined anaerobic/aerobic systems comprise an anaerobic reactor and an aerobic reactor, where the influent of the aerobic reactor is pretreated in the anaerobic reactor and treated in the aerobic and anoxic phases in said aerobic reactor.

AD is divided into four sequential stages: hydrolysis, acidogenesis, acetogenesis, and methanogenesis. Many different microorganisms are involved in anaerobic digestion, mainly hydrolytic bacteria, fermentative acidogenic bacteria, acetogenic bacteria and methanogenic archaea, which work in sequence. This means that the products of one stage serve as substrates for the next. The nature of the microbial community in a reactor depends on the feedstock fed to the reactor, such feedstocks may be livestock waste, sewage sludge or food and crop waste.

Most of the bacteria involved in AD are strict/obligate anaerobes, which die in the presence of oxygen. The majority of the remaining bacteria are facultative/oxygen-tolerant anaerobes. Facultative anaerobes make ATP by aerobic respiration in the presence of oxygen, but are capable of fermentation or anaerobic respiration in the absence of oxygen. Although facultative anaerobes survive in the presence of oxygen, they cannot perform degradation under such conditions.

During AD, hydrolytic bacteria break down organics such as carbohydrates, proteins and fats into simple sugars, amino acids and fatty acids using water. Acetogenic bacteria convert these sugars, amino acids and fatty acids to ammonia, $H_2$, $CO_2$, $H_2S$, short fatty acids, carbonic acid, and alcohols. Homoacetogenic bacteria catabolize acetic acid, carbon dioxide ($CO_2$) and $H_2$. The methanogens break down acetic acid to form methane ($CH_4$) and carbon dioxide ($CO_2$). Additional bacterial species include polyphosphate-accumulating bacteria (PAB), facultative anaerobic bacteria, which during the aerobic phase accumulate phosphate in their cells as polyphosphate (POLYP), thereby facilitating phosphate removal from wastewater, a process called enhanced biological phosphorus removal (EBPR). Under anaerobic conditions PABs are able to digest carbon compounds, and this ability gives them an advantage within the mixed microbial community present in the activated sludge.

Excess sodium and phosphorus levels caused by runoff from anaerobic digesters, may negatively affect freshwater quality and thereby the entire ecosystem. Indeed, both free Na cation and phosphate ion ($PO_4^{-3}$) are considered harmful agents. $Na^+$ increases salinity of soil (increasing SAR—sodium adsorption ratio) leading to decreased ability of the soil to form stable aggregates, and to loss of soil structure and tilth, which inhibits plant growth. Phosphate ions evoke alga blooms (eutrophication) and anoxia state in the open seas and watersheds via leaking and runoff.

The production of biogas, as well as the quality of water effluent and discharged sludge, depends largely on the microbial community in the reactors. Accordingly, there is need to maintain and optimize a healthy microbial community in the digester. Such maintenance is influenced by the reproductive rate of the bacteria, which depends on the temperature in the reactors, and minimum solids retention time (SRT) which is defined according to the sufficient bacterial doubling time (time needed to reproduce).

The discharge of waste activated sludge (WAS) and effluent should also be taken into account, since bacteria which have attached to the settled solid waste are cleared from the apparatus in this way.

The apparatus design and its operation affect the microbial community and thereby influence the overall performance of the apparatus. It has now been found that in order to effectively operate a plurality of reactors of the type described above, it is advantageous to perform cycling of WAS between the reactors. Such transfer of WAS results in the efficient operation of the apparatus and maintains a steady microbial community.

The present method and apparatus allow for efficient processing of any feedstock waste by maximizing the breakdown of organic matter, while efficiently handling the environmentally harmful ions. The present system allows for collecting biogas from the anaerobic reactors, enhancing phosphorus removal, enhancing nitrogen removal in the aerobic-anoxic phase, and removing sodium ions. These advantageous features are attributed to the microorganism behavior under the specific conditions created by the apparatus architecture and operation.

The above and other purposes and advantages of the invention will become apparent as the description proceeds.

SUMMARY OF THE INVENTION

The present invention provides a method for maintaining a steady microbial community in a combined anaerobic-aerobic apparatus, comprising at least two anaerobic reactors and at least one aerobic reactor, each of said reactors being in recycling communication with at least one other reactor, the reactors containing wastewater and suspended waste activated sludge (WAS) in which said microbial community is comprised, usually adsorbed or absorbed, comprising the steps of i) transferring a portion of said WAS from said at least one aerobic reactor to at least one of said at least two anaerobic reactors; and ii) transferring a portion of said WAS between said at least two anaerobic reactors; said microbial community comprising Archea, wherein said Archea constitute at least 4% of the microbial community in said anaerobic reactors, and wherein at least 25% of said Araehea in said anaerobic reactors are methanogens.

In some embodiments, the microbial community comprises polyphosphate-accumulating organisms (PAOs), hydrolytic bacteria, fermentative acidogenic bacteria, and acetogenic bacteria, and methanogens.

In some aspects of the invention, the stable microbial community of the anaerobic reactors comprises Archea constituting at least 5%, such as at least 6%, or such as at least 7%, or such as at least 8% of the microbial population. In some aspects of the invention, the stable microbial community of the anaerobic reactors comprises bacteria belonging to Bacteriodetes, constituting at least 20% of the microbial population, such as at least 30%. In some aspects of the invention, the stable microbial community of the anaerobic reactors comprises bacteria belonging to Firmicutes, constituting at least 10% of the microbial population, such as at least 15%. In some aspects of the invention, at least 25% of said Archea are methanogens, such as at least 30%, such as at least 35%, such as at least 40%. In some aspects of the invention, the stable microbial community of the anaerobic reactors comprises methanogens constituting at least 1%, such as at least 2%, such as at least 3%, such as about 4% or more of the microbial population.

In some embodiments, at least 70% of the WAS is transferred in step (i) and/or step (ii). In some embodiments, at least 80% of said WAS is transferred in step (i) and/or step (ii), more preferably, at least 90% of said WAS is transferred in step (i) and/or step (ii).

In some embodiments, the recycling is performed in batches. In some of these embodiments, there are between 2 to 6 batches per day.

The invention provides an apparatus for maintaining a steady microbial community during the processing of feedstock waste, comprising: a) at least two anaerobic reactors configured to alternately homogenize their contents and allow the waste activated sludge (WAS) to settle; b) at least one aerobic reactor configured to alternately homogenize its contents and allow the WAS to settle; c) conduits configured to transfer at least 70% of said WAS from said at least one aerobic reactor to at least one of said at least two anaerobic reactors; and d) conduits configured to transfer at least 70% of said WAS between said at least two anaerobic reactors; where each of the reactors is in recycling communication with at least one other reactor.

The anaerobic reactors of the apparatus may comprise upflow anaerobic sludge blanket reactor (UASB), continuous stirred-tank reactor (CSTR), plug flow reactor (PFR), anaerobic fluidized bed reactor (AFBR), expanded granular sludge bed reactor (EGSB), and anaerobic sequencing batch reactor (ASBR). In a preferred embodiment the anaerobic reactors are selected from anaerobic sequencing batch reactors (ASBR).

The aerobic-anoxic reactors of the apparatus may comprise upflow sludge blanket reactor (USB), continuous stirred-tank reactor (CSTR), plug flow reactor (PFR), fluidized bed reactor (FBR), expanded granular sludge bed reactor (EGSB), sequencing batch reactor (SBR) and moving bed biofilm reactor (MBBR). In a preferred embodiment the aerobic reactor is selected from aerobic sequencing batch reactors (SBR).

The method and the apparatus of the invention provide for at least partial removal of sodium from feedstock waste.

BRIEF DESCRIPTION OF THE DRAWING

FIG. 1 is a schematic representation of an apparatus operating according to one embodiment of the invention.

DETAILED DESCRIPTION

The reactors of an anaerobic-aerobic system contain many different microorganisms which are involved in various sequential steps of digestion. In such systems it is essential to maintain a stable microbial community to ensure the efficient digestion of feedstock.

In one embodiment, the present invention relates to a method for maintaining a steady microbial community in a combined anaerobic-aerobic apparatus, comprising at least two anaerobic reactors and at least one aerobic reactor, each of the reactors being in recycling communication with at least one other reactor, comprising the steps of:
i) transferring a portion of waste activated sludge (WAS) from said aerobic reactor to at least one of said at least two anaerobic reactors; and
ii) transferring a portion of WAS between said at least two anaerobic reactors.

According to some embodiments of the invention, at least 70% of the WAS is transferred in step (i) and/or step (ii). In some further embodiments, at least 80% of the WAS is transferred in step (i) and/or step (ii). More preferably, at least 90% of the WAS is transferred in step (i) and/or step (ii).

It is a purpose of the invention to maintain a steady microbial community and the resulting efficiently constant operation of the apparatus. The cycling of WAS in the reactors ensures that obligate anaerobes and facultative anaerobes are maintained in the apparatus, thereby facilitating the digestion of feedstocks.

As used herein, the term "waste activated sludge" or "WAS" relates to a suspension of settled solids at the bottom part of the reactor, containing particles and living organisms. In this respect, the bottom part will normally be considered the bottom third of the reactor, but the withdrawal point can be located at various heights and positions in the reactor, and is not limited to any particular location. Said WAS will typically form a sludge that is flowable.

As used herein, the term "portion" denotes a volume of WAS, waste or sludge which is determined according to the size of the reactors in the apparatus. Accordingly, it will be appreciated by the skilled person that the volume of said portion is scalable and is set according to the capacity of the facility and other considerations. The volume of said portion may also vary according to the components of the facility from which and to which the portion is being transferred.

As used herein, the term "recycling communication" is used to indicate that the liquid, waste, sludge or gas may be recycled from one component of the facility to another, i.e. the waste is transferred between components of the facility. The term also encompasses the transfer of portions of waste or WAS. Accordingly, it should be understood that a reactor is considered to be found in recycling communication with another reactor if it either transfers waste from itself to another reactor, or receives waste transferred to it from another reactor.

Performing the recycling of sludge is known in the art and is therefore not discussed herein in detail, for the sake of brevity. However, it should be understood that recycle lines 105 and 106, as well as feed from one vessel to another, comprise conventional flow elements such as pumps normally used to perform this kind of operation. Other conventional elements not shown may include valves, gages, control equipment, and other processing equipment and devices well understood by a person skilled in the art.

The reactors are in communication with one another through a conduit, channel, pipe or tube suitable for transferring liquid, waste, sludge or gas from one component of the facility to another. Pumps and gravity driven means can be included in a conduit, channel, pipe or tube to facilitate transfer of liquid, waste, sludge or gas. In some cases the conduit, channel, pipe or tube may further comprise valves capable of opening and closing for regulating the flow of waste.

In some embodiments, the feedstock waste is recycled between the at least one aerobic-anoxic reactor and the at least two anaerobic reactors in batches, according to some of these embodiments, the batches are between 2 to 6 batches per day.

In some embodiments the invention relates to an apparatus for maintaining a steady microbial community during the processing of feedstock waste, comprising:
a) at least two anaerobic reactors;
b) at least one aerobic reactor;
c) conduits for transferring a portion of waste activated sludge (WAS) from the at least one aerobic reactor to at least one of the at least two anaerobic reactors; and
d) conduits for transferring at least one portion of WAS between the at least two anaerobic reactors;
where each of the reactors is in recycling communication with at least one other reactor.

According to some embodiments, the invention may be applied to a combined anaerobic-aerobic apparatus such as the one schematically depicted in FIG. 1. The apparatus 100 comprises at least two anaerobic reactors (four such reactors being shown in the figure) 102, 103, 108, 109 and at least an aerobic-anoxic reactor 104. Feedstock waste 101 is fed into the first anaerobic reactor 102 and waste is treated and then transferred from one anaerobic reactor to the next 102, 103, 108, 109 and then transferred to the aerobic-anoxic reactor 104.

WAS is cycled back via line 105 from the aerobic reactor 104 to the anaerobic reactor 109. Additionally, WAS from the bottom part of one anaerobic reactor 109 is transferred via line 106 from one anaerobic reactor 109 to another 108, 103, 102. While in the figure reactor 109 is shown as cycling WAS back to reactor R3, it is understood that it may transfer WAS to any other reactor, or its back-cycling stream can be split between two or more reactors. Of course, any other reactor in the apparatus can operate in the same way.

The present invention is applicable to any combined anaerobic-aerobic arrangement, which may comprise two or more anaerobic reactors, at least one aerobic reactor and any number of reserve and treatment tanks or vessels. Such tanks may be, but are not limited to, water tanks for containing the water effluent, collection tanks for containing feedstock to be fed to the apparatus, tanks for containing the discharged waste or tanks for further treatment and purification of the water effluent.

The method is further applicable to any feedstock waste to be treated. In this respect, feedstock waste may be sewage sludge, livestock waste, food and drink waste, including slaughterhouse, bakery or brewery waste, agricultural waste, or any organic waste, but the invention is not limited to any specific feed material.

Examples of anaerobic reactors suitable for operation in the context of the invention include upflow anaerobic sludge blanket reactor (UASB), continuous stirred-tank reactor (CSTR), plug flow reactor (PFR), anaerobic fluidized bed reactor (AFBR), expanded granular sludge bed reactor (EGSB), and anaerobic sequencing batch reactor (ASBR). The anaerobic reactor may comprise a gas collector for collecting biogas, including methane. The anaerobic reactor is preferably ASBR.

Examples of aerobic reactors suitable for operation in the context of the invention include upflow sludge blanket reactor (USB), continuous stirred-tank reactor (CSTR), plug flow reactor (PFR), fluidized bed reactor (FBR), expanded granular sludge bed reactor (EGSB), sequencing batch reactor (SBR) and moving bed biofilm reactor (MBBR). The aerobic-anoxic reactor preferably comprises an efficient aeration device for suppling air or oxygen to the reactor when needed. The aerobic reactor is preferably SBR.

In some embodiments, the aerobic reactor has anoxic and aerobic phases for the efficient removal of nitrogen from the waste (denitrification). During the aerobic treatment of waste, nitrogen is first converted into nitrate (nitrification). The nitrified waste is then exposed to an environment without free oxygen (anoxic), and under these conditions microorganisms use nitrate as an electron acceptor and release nitrogen in the form of nitrogen gas or nitrogen oxides.

In some embodiments, the method and apparatus of the invention facilitate the efficient removal of sodium from the feedstock waste. In some of these embodiments, at least 10% of the sodium is removed. More preferably, at least 20% of the sodium is removed.

The apparatus of the invention includes a rich microbial community including polyphosphate-accumulating bacteria (PAB), hydrolytic bacteria, fermentative acidogenic bacteria, acetogenic bacteria, and methanogenic archaea.

As will be appreciated by the skilled person, one of the advantages of the invention is that it provides a simple method for maintaining a stable microbial community in a combined anaerobic-aerobic apparatus, thus affording efficient digestion of feedstocks and better overall performance of the apparatus.

Examples

Apparatus

Apparatus 1: A small pilot apparatus was built in a cowshed for treating waste collected from ~20 cows (1-2 $m^3$ per day). The apparatus comprised a collecting basin, a 6 $m^3$ pretreatment channel and two reactors of 5 $m^3$ each, serving as the anaerobic and aerobic-anoxic reactors.

Apparatus 2: An apparatus having a 400 $m^2$ groundplan was built on a central dairy farm in Israel for treating the waste of 100 cows (10 $m^3$ per day). The apparatus comprises a stirred feed vessel, two 100 $m^3$ stirred ASBRs, an 100 $m^3$ aerobic SBR, a sewage grade water vessel, and a discharge basin. Biogas is collected from the two ASBRs. Cow manure having 13% TS was diluted to 2.5% TS using milking wastewater and 10 $m^3$ of waste was treated daily.

Table 1 shows the sodium removal in Apparatus 1 and Apparatus 2 on different days.

TABLE 1

| Apparatus | Date | | Na [mg/lit] | % reduction |
|---|---|---|---|---|
| Apparatus 1 | 13 Aug. 2017 | T0 | 319 | |
| | | eff | 242 | 24% |
| | 23 Oct. 2017 | T0 | 189 | |
| | | eff | 167 | 12% |
| Apparatus 2 | 21 Feb. 2018 | T0 | 405 | |
| | | eff | 341 | 16% |
| | 14 Mar. 2018 | T0 | 628 | |
| | | eff | 420 | 33% |
| | 1 May 2018 | T0 | 477 | |
| | | eff | 385 | 19% |

The data from both apparatuses show an average reduction of 21% in Na.

Microbial Community in the Anaerobic Reactor

During the time of sampling, the methane content of the collected biogas was stable, showing values around (66±1) % methane over five days of operation. Microbiome sampling was conducted on the third day.

A microbiome study has been performed in samples taken from the first anaerobic reactor of Apparatus 2 described above. Three samples from anaerobic reactor were taken in 20 min increments during mixing stage. In order to identify the bacterial community in a sample, NGS was used to sequence a fragment of the 16s ribosomal RNA gene. Briefly, DNA was extracted from the samples, subjected to two rounds of Polymerase Chain Reaction, and sequenced using the Illumina Miseq with an aim of 50,000 reads per sample. The data was processed using Illumina Basespace site, FASTQ and the CLC-bio program the OTU's, and abundance tables were generated using either the Greengene or SILVA databases. The below results represent average values of triplicate samples with 10% error.

Of the microbial population, Bacteria represented 90% and Archea 9%. Of the bacterial population, Firmicutes represented 17% and Bacteroidetes 38%. Of the archeal population, Methanomicrobia represented 42%. Methanogenes thus represented about 4% of the microbial population. It is believed by the inventors that the reactors regimen results in particular microbial composition, which is stable and which provides an efficient decomposition of the waste; such composition is characterized by at least 2% Archea in the microbial population, such as at least 4%, such as at least 6%, such as at least 8% Archea. Said stable and advantageous microbial population may be further characterized by at least 20% Bacteroidetes, such as at least 30%. Said stable and advantageous microbial population may be also characterized by at least 10% Firmicutes in the microbial population, such as at least 15%.

Although embodiments of the invention have been described by way of illustration, it will be understood that the invention may be carried out with many variations, modifications, and adaptations, without exceeding the scope of the claims.

The invention claimed is:

1. A method for maintaining a microbial community in a combined anaerobic-aerobic apparatus, comprising at least two anaerobic reactors and at least one aerobic reactor, each of said reactors being in recycling communication with at least one other reactor, the reactors containing wastewater and suspended waste activated sludge (WAS) in which said microbial community is comprised, comprising the steps of
   i) transferring a portion of said WAS from said at least one aerobic reactor to at least one of said at least two anaerobic reactors; and
   ii) transferring a portion of said WAS between said at least two anaerobic reactors;
   said microbial community comprising Archea, wherein said Archea constitute at least 4% of the microbial community in said anaerobic reactors, and wherein at least 25% of said Archea in said anaerobic reactors are methanogens.

2. A method according to claim 1, wherein the microbial community further comprises polyphosphate-accumulating bacteria (PAB), hydrolytic bacteria, fermentative acidogenic bacteria, and acetogenic bacteria.

3. A method according to claim 1, wherein at least 70% of said WAS is transferred in step (i) and/or step (ii).

4. A method according to claim 1, wherein at least 80% of said WAS is transferred in step (i) and/or step (ii).

5. A method according to claim 1, wherein at least 90% of said WAS is transferred in step (i) and/or step (ii).

6. The method of claim 5, wherein said recycling is performed in 2 to 6 batches per day.

7. The method of claim 1, resulting in at least partial removal of sodium from feedstock waste.

8. An apparatus for maintaining a microbial community during processing of feedstock waste, comprising
   a) at least two anaerobic reactors configured to alternately homogenize their contents and allow waste activated sludge (WAS) to settle;
   b) at least one aerobic reactor configured to alternately homogenize its contents and allow the WAS to settle;
   c) conduits configured to transfer at least 70% of said WAS from said at least one aerobic reactor to at least one of said at least two anaerobic reactors; and
   d) conduits configured to transfer at least 70% of said WAS between said at least two anaerobic reactors;
   wherein each of said reactors is in recycling communication with at least one other reactor.

9. The apparatus according to claim 8, wherein the anaerobic reactor is selected from anaerobic sequencing batch reactors (ASBR).

10. The apparatus according to claim 8, wherein the aerobic reactor is selected from sequencing batch reactors (SBR).

11. The apparatus according to claim 8, providing for at least partial removal of sodium from feedstock waste.

* * * * *